(12) United States Patent
Racicot

(10) Patent No.: US 7,802,796 B2
(45) Date of Patent: Sep. 28, 2010

(54) COMPOSITE MATERIAL AND SEALS FORMED THEREOF

(75) Inventor: Robert Thomas Racicot, Murrietta, CA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 795 days.

(21) Appl. No.: 11/619,114

(22) Filed: Jan. 2, 2007

(65) Prior Publication Data

US 2007/0176372 A1  Aug. 2, 2007

Related U.S. Application Data

(60) Provisional application No. 60/756,437, filed on Jan. 5, 2006.

(51) Int. Cl.
*F16J 15/00* (2006.01)
*C08K 3/04* (2006.01)
*C08L 27/00* (2006.01)

(52) U.S. Cl. .................. 277/500; 524/495; 524/496; 524/502; 524/544; 525/132; 525/189

(58) Field of Classification Search .......... 524/495, 524/496; 277/500
See application file for complete search history.

(56) References Cited

U.S. PATENT DOCUMENTS

| | | | |
|---|---|---|---|
| 4,050,701 A | 9/1977 | Webb | |
| 4,163,742 A * | 8/1979 | Mansure | 523/220 |
| 4,333,977 A | 6/1982 | Abrahams et al. | |
| 4,502,694 A | 3/1985 | Uhrner | |
| 4,703,076 A * | 10/1987 | Mori | 524/420 |
| 4,721,312 A | 1/1988 | Hornberger | |
| 4,735,144 A | 4/1988 | Jenkins | |
| 4,749,752 A | 6/1988 | Youlu et al. | |
| 4,750,748 A | 6/1988 | Visser | |
| 4,804,290 A | 2/1989 | Balsells | |
| 4,819,443 A | 4/1989 | Watanabe et al. | |
| 4,907,788 A | 3/1990 | Balsells | |
| 5,494,300 A | 2/1996 | Tanaka et al. | |
| 5,575,634 A | 11/1996 | Tanaka et al. | |
| 5,763,082 A | 6/1998 | Kokumai et al. | |
| 5,767,186 A | 6/1998 | Shimokusuzono et al. | |
| 5,992,856 A | 11/1999 | Balsells et al. | |
| 6,341,384 B1 | 1/2002 | Hayes | |
| 6,376,109 B1 | 4/2002 | Sano et al. | |
| 6,749,649 B2 | 6/2004 | Sano et al. | |
| 2001/0039966 A1 | 11/2001 | Walpole et al. | |
| 2002/0086191 A1 | 7/2002 | Sano et al. | |
| 2002/0090537 A1 | 7/2002 | Sano et al. | |
| 2002/0153664 A1 | 10/2002 | Schroeder | |
| 2002/0155289 A1 | 10/2002 | Cistone et al. | |
| 2003/0085532 A1 | 5/2003 | Spiegl et al. | |
| 2003/0085533 A1 | 5/2003 | Spiegl et al. | |
| 2003/0111798 A1* | 6/2003 | Yanagiguchi et al. | 277/500 |
| 2003/0144156 A1 | 7/2003 | Saito | |
| 2004/0208406 A1 | 10/2004 | Budde et al. | |
| 2005/0106970 A1 | 5/2005 | Stanitis et al. | |
| 2005/0121437 A1 | 6/2005 | Spohn et al. | |
| 2005/0189725 A1 | 9/2005 | Edwards | |
| 2005/0221038 A1 | 10/2005 | Park | |

FOREIGN PATENT DOCUMENTS

| | | |
|---|---|---|
| EP | 0 202 996 A2 | 11/1986 |
| EP | 0 850 993 A1 | 7/1998 |
| EP | 0 874 023 A1 | 10/1998 |
| EP | 0 583 481 B1 | 11/1999 |
| EP | 0 739 046 B1 | 3/2000 |
| EP | 0 916 044 B1 | 4/2003 |
| EP | 1 584 645 A1 | 10/2005 |
| JP | 61-169231 | 7/1986 |
| JP | 62-105623 | 5/1987 |
| JP | 62-146944 | 6/1987 |
| JP | 3-273083 | 12/1991 |
| JP | 6-340866 | 12/1994 |
| JP | 07-062184 | 3/1995 |
| JP | 7-268126 | 10/1995 |
| JP | 8-105391 | 4/1996 |
| JP | 10-237301 | 9/1998 |
| JP | 10-237421 | 9/1998 |
| JP | 2001-115976 | 4/2001 |
| JP | 2001-181603 | 7/2001 |
| WO | WO 96/40857 | 12/1996 |
| WO | WO 99/11355 | 3/1999 |
| WO | WO 01/06881 A1 | 2/2001 |
| WO | WO 01/18289 A1 | 3/2001 |
| WO | WO 02/20886 A1 | 3/2002 |
| WO | WO 02/43881 A1 | 6/2002 |
| WO | WO 2005/056647 A2 | 6/2005 |

(Continued)

OTHER PUBLICATIONS

Machine translation of JP 07-062184 A, Mar. 7, 1995.*

(Continued)

*Primary Examiner*—Vickey Nerangis
(74) *Attorney, Agent, or Firm*—Larson Newman & Abel, LLP; Chi Suk Kim

(57) ABSTRACT

A seal is formed of a material including about 80.0% to about 95.0% by weight fluoropolymer, about 1.0% to about 10.0% by weight aromatic polymer, and graphite fiber.

12 Claims, 1 Drawing Sheet

FOREIGN PATENT DOCUMENTS

| | | |
|---|---|---|
| WO | WO 2005/064212 A2 | 7/2005 |
| WO | WO 2005/119103 | 12/2005 |

OTHER PUBLICATIONS

Mark P. Wolverton et al.; "Tribological Properties of Reinforced and Lubricated Thermoplastic Composites at Elevated Temperatures"; Session 15-B, pp. 1-8; Feb. 7-11, 1983.

Kevin Yu et al.; "Wear Tests of Polymer Composite Compressor Seal Materials in Hydrogen Environment"; Paper No. 52; Copyright 1999 by NACE International.

"Buckyballs, Diamond, and Graphite"; on-line, BDG Graphite and Carbon Fibers; pp. 1-13; Dec. 22, 2005.

"Dyneon TFM PTFE, Improved performance and design flexibility"; on-line, pp. 1-20; Copyright Dyneon 2002.

\* cited by examiner

COMPOSITE MATERIAL AND SEALS FORMED THEREOF

FIELD OF THE DISCLOSURE

This disclosure, in general, relates to composite materials and seals formed thereof.

BACKGROUND

Traditionally, seals are used to prevent fluids from flowing between joints of rigid components. In particular examples, seals are used in pumps and between flanges to limit fluid flow out of containment regions. For example, seals along pump shafts may limit lubricating fluids or pressurized process fluids from escaping along an annulus defined by the shaft and a housing. Traditionally, such seals have been formed of malleable materials, such as graphite or metal strips in the case of flange seals or elastomeric materials in the case of shaft seals. However, traditional materials have proven ill suited for new applications, such as high pressure liquid chromatography systems.

High pressure liquid chromatography uses a high pressure liquid carrier medium to separate chemical species by moving the species across an adsorption medium. Different chemical components adsorb on and desorb from the adsorption medium at different rates resulting in separation of the components as the carrier medium moves through or around the adsorption medium. Accordingly, the effectiveness of a high pressure chromatography system may be adversely influenced by extraneous ions or particulate materials in the carrier medium. As such, new materials are being used in the formation of pumps and other components of high pressure liquid chromatography columns. Traditional sealing components using traditional sealing materials have been shown to damage pump components formed of the new materials compatible with liquid chromatography systems or have been shown to release undesirable ions or particulate materials into the liquid carrier medium, which reduce the effectiveness of high pressure liquid chromatography systems. In particular, traditional sealing materials may scratch pump shafts, damaging expensive pump components and shortening the lifespan of pumps. In another example, the traditional sealing material may release particulate material into the liquid carrier medium clogging the liquid chromatography column and reducing the effectiveness of the high pressure liquid chromatography system. In particular examples, the particulate material may act as an additional adsorption surface, adversely influencing the separation of chemical components.

As such, an improved seal material would be desirable.

SUMMARY

In a particular embodiment, a seal is formed of a material including about 80.0% to about 95.0% by weight fluoropolymer, about 1.0% to about 10.0% by weight aromatic polymer, and graphite fiber.

In another exemplary embodiment, a pump includes a rod and a seal. The seal includes a surface in contact with the rod. The seal is formed of a material comprising about 80.0% to about 95.0% by weight fluoropolymer, about 1.0% to about 10.0% by weight aromatic polymer, and graphite fiber.

In a further exemplary embodiment, a composite material includes at least about 80.0 wt % modified polytetrafluoroethylene, not greater than about 10.0 wt % aromatic polymer, and at least about 1.0 wt % graphite fiber. The modified polytetrafluoroethylene includes perfluoropropyl vinyl ether in an amount not greater than about 5.0 wt %.

BRIEF DESCRIPTION OF THE DRAWINGS

The present disclosure may be better understood, and its numerous features and advantages made apparent to those skilled in the art by referencing the accompanying drawings.

DESCRIPTION OF THE PREFERRED EMBODIMENTS

Figure 1:
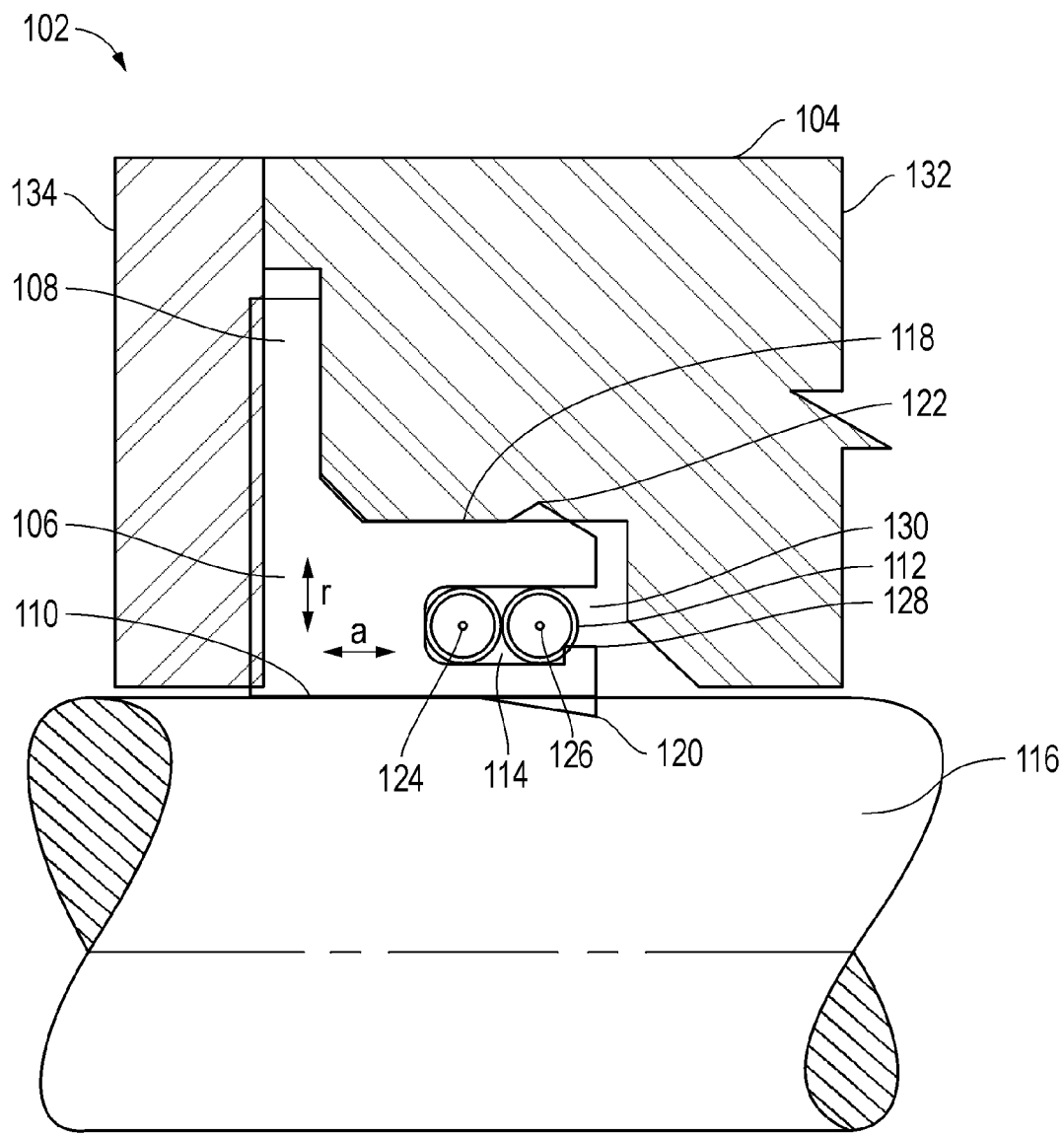
FIG. 1 includes an illustration of a portion of an exemplary pump in which a seal formed of the disclosed seal material may be used.

In a particular embodiment, a seal is formed of a material including a fluoropolymer, an aromatic polymer, and graphite fiber. The fluoropolymer may include a modified polytetrafluoroethylene (PTFE), such as a PTFE modified with perfluoropropyl vinyl ether (PPVE). The aromatic polymer may include phenyl polymer, such as polyphenylenesulfide or polyphenyleneoxide. In particular, the seal may be formed in annular configuration for use in a pump with a rod extending through the center of the seal. The rod, for example, may be formed of sapphire.

In an exemplary embodiment, the material forming the seal includes a fluoropolymer, an aromatic polymer, and graphite fiber. In an exemplary embodiment, the material includes a polymer matrix formed of a fluoropolymer, and in particular, a fluoropolymer that exhibits a low coefficient of friction. An exemplary fluoropolymer includes a polymer formed from a fluorine substituted olefin monomer or a polymer including at least one monomer selected from the group consisting of vinylidene fluoride, vinylfluoride, tetrafluoroethylene, hexafluoropropylene, trifluoroethylene, chlorotrifluoroethylele, or a mixture of such fluorinated monomers. An exemplary fluoropolymer may include a polymer, a polymer blend or a copolymer including one or more of the above monomers, such as, for example, fluorinated ethylene propylene (FEP), ethylene-tretrafluoroethylene (ETFE), poly tetrafluoroethylene-perfluoropropylvinylether (PFA), poly tetrafluoroethylene-perfluoromethylvinylether (MFA), polytetrafluoroethylene (PTFE), polyvinylidene fluoride (PVDF), ethylene chlorotrifluoroethylene (ECTFE), polychlorotrifluoroethylene (PCTFE), or tetrafluoroethylene-hexafluoropropylene-vinylidene fluoride (THV). In particular, the fluoropolymer may be polytetrafluoroethylene (PTFE), such as a modified PTFE. In an example, the modified PTFE is a copolymer of tetrafluoroethylene and a vinyl ether, such as perfluoropropylvinylether (PPVE). In an embodiment, the modified PTFE includes at least about 0.01 wt % perfluoropropylvinylether (PPVE). In another example, the modified PTFE includes not greater than about 5.0 wt % PPVE, such as not greater than about 3.0 wt % or not greater than about 1.5 wt % PPVE. While particular embodiments of modified PTFE that include PPVE are melt processable, a particularly useful modified PTFE includes a small amount of PPVE such that the modified PTFE is not melt processable and instead is typically solution deposited and sintered. Particular examples of modified PTFE are commercially available, such as TFM1700 available from Dyneon, Teflon® NXT available from DuPont®, and M1-11 available from Daikon.

The material may include at least about 80.0 wt % fluoropolymer. For example, the material may include about 80.0 wt % to about 95.0 wt % fluoropolymer, such as about 85.0 wt % to about 91.0 wt % fluoropolymer. In a particular example, the material includes about 80.0 wt % to about 95.0 wt % modified PTFE, such as about 85.0 wt % to about 91.0 wt % of the modified PTFE.

In an exemplary embodiment, the material includes an aromatic polymer. For example, the aromatic polymer may include phenyl polymer, such as polyphenylenesulfide or polyphenyleneoxide. In a particular example, the aromatic polymer includes polyphenylenesulfide. The material may include about 1.0 wt % to about 10.0 wt % of the aromatic polymer. For example, the material may include about 3.0 wt % to about 7.0 wt % of the aromatic polymer. In a particular example, the composite material includes about 1.0 wt % to about 10.0 wt %, such as about 3.0 wt % to about 7.0 wt % polyphenylenesulfide.

In addition, the material or composite material includes graphite fiber. Graphite fiber is differentiated from traditional carbon fibers by crystalline structure and is differentiated from traditional graphite by form. Typically, carbon fibers are formed from organic polymers, such as polyacrylonitrile, or are formed from pitch. The organic fibers are generally treated through oxidation in air at between about 200° C. and 300° C. to form non-meltable precursor fibers. Such precursor fibers are heated in a nitrogen environment at about 1000° C. to about 2500° C. to form carbon fibers. Often such carbon fibers include at least about 92.0 wt % carbon. In an exemplary embodiment, graphite fibers may be formed by heating such carbon fibers at between about 2500° C. to about 3000° C., resulting in the distinct crystalline structure of graphite while maintaining a fiber form. As a result, carbon fibers are differentiable from graphite fibers by observing crystalline structure, such as through x-ray diffraction.

With respect to graphite, graphite is typically particulate in form and thus is different from the graphite fibers of the disclosed composite material. Particulate graphite is often formed by crushing mineral graphite or through heating of petroleum products at about 2800° C. Such processes produce graphite particulate that is different in both form and mechanical properties from the graphite fibers formed through methods, such as the exemplary method disclosed above.

In an exemplary embodiment, the composite material includes about 1.0 wt % to about 10.0 wt % of the graphite fiber. For example, the material may include about 3.0 wt % to about 7.0 wt % of the graphite fiber.

In an exemplary embodiment, the material may exhibit desirable mechanical and surface properties. For example, the material may exhibit desirable coefficient of friction. In particular, the material may have a coefficient of friction between about 0.1 and 0.5, such as about 0.2 to about 0.4, or even about 0.25 to about 0.35. In addition, the composite material may exhibit a desirable tensile modulus determined in accordance with ASTM D638. For example, the tensile modulus of the composite material may be about 100 MPa to about 500 MPa, such as about 200 MPa to about 300 MPa. In another example, the composite material may exhibit a desirable compressive modulus determined in accordance with D695. For example, the composite material may exhibit a compressive modulus of about 400 MPa to about 800 MPa, such as about 500 MPa to about 700 MPa, or even about 600 MPa to about 700 MPa. Further, the composite material may exhibit a desirable hardness determined in accordance with ASTM D2240. For example, the composite material may exhibit a hardness (Shore D) of about 40 to about 80, such as about 50 to about 70, or even about 55 to about 65. In addition, the composite material may exhibit a desirable deformation under load determined in accordance with ASTM D621 with a load of 2000 psi for 24 hours at 72° C. For example, the deformation under load of the composite material may be about 1% to about 5%, such as about 2% to about 4%.

In an additional example, the composite material may exhibit a desirable tensile strength, elongation, or compressive strength. Tensile strength and elongation are determined in accordance with ASTM D638 and compressive strength is determined in accordance with ASTM D695 at 1% strain. For example, the composite material may exhibit a tensile strength of about 5 MPa to about 25 MPa, such as about 10 MPa to about 20 MPa, or even about 12 MPa to about 18 MPa. Further, the composite material may exhibit an elongation of about 200% to about 600%, such as about 250% to about 500%, or even about 250% to about 350%. The compression strength of the composite material may be about 5 MPa to about 20 MPa, such as about 10 MPa to about 15 MPa.

Further, the composite material may exhibit desirable thermal properties, such as linear coefficient of thermal expansion (CTE, determined in accordance with ASTM E831). For example, the CTE may be not greater than about 30 mm/mm° C., such as not greater than about 20 mm/mm° C., or even not greater than about 15 mm/mm° C.

Furthermore, the material when formed into a seal may exhibit desirable resistance to degradation when exposed to liquid carrier media, such as de-ionized water, methanol, or a blend of phosphoric buffer solution and methanol. In particular, seals formed of the composite material may operate at least about 300 hours without a leak failure when exposed to a liquid carrier medium, such as de-ionized water, methanol, or a blend of phosphoric buffer solution and methanol.

In a particular embodiment, the seal formed of the composite material may be used in an annular configuration in a pump. FIG. 1 includes an illustration of a portion 102 of an exemplary pump. The portion 102 includes a rigid body 104 surrounding a rod 116. In a particular example, the rod 116 is formed of sapphire. The rigid body 104 may include sections 132 and 134 configured to engage a seal body 106.

The seal body 106 formed of the exemplary material forms an annular sealing surface 110 that is configured to contact the rod 116. The seal body 106 also may form a second annular sealing surface 118 that is configured to contact the rigid body 104. An annular sealing surface is a sealing surface that extends axially and circumferentially around an annular body, such as the seal body 106. For example, annular sealing surface 110 forms a radially innermost surface of the seal body 106 and defines a bore through which a rod may be inserted. In another example, annular sealing surface 118 forms a radially outermost sealing surface configured to contact a pump housing. In an exemplary embodiment, the seal 106 includes a flange portion 108 which may act to form additional sealing surfaces or may be used to secure the seal. The seal body may also include annular ridges, such as annular ridges 120 and 122 protruding from the annular sealing surfaces 110 and 118, respectively. As illustrated in FIG. 1, ridges and edges are illustrated in a precompressed form to illustrated the form of the seal body prior to distortion by compression between the rod 116 and the housing 104.

In addition, the seal 106 includes a cavity 114 in which at least one spring 112 is situated. In a particular embodiment, the seal 106 includes at least two annular springs 112 situated axially adjacent to each other and annularly surrounding the rod 116. In a particular embodiment, a peak of the annular ridge 120 is axially spaced apart from the central axes (124 and 126) of each of the annular springs 112. The seal body 106 defines an opening 130 to the cavity 114 at one axial end. The seal body may further include an annular lip 128 located on one side of the opening 130.

Particular embodiments of seals formed of the disclosed material advantageously exhibit desirable sealing properties. For example, embodiments advantageously exhibit low wear damage to and scratching of sapphire pump rods. Further, embodiments advantageously exhibit low release of particulate material to liquid carrier media.

EXAMPLE

Seals of the design illustrated in FIG. 1 are formed of 90.0 wt % modified PTFE, 5.0 wt % polyphenylenesulfide, and 5.0 wt % graphite fiber. The seals are rated based on the total time to failure in the presence of one of three fluids.

The seals are tested in a Shimadzu LC10ATvp high pressure liquid chromatography (HPLC) pump. The pump is designed with two heads that operate in a series. One seal is installed in each head. The seal is installed over a sapphire rod and the pump head is secured to the main pump body. The sapphire rod operates in a reciprocating linear motion to produce a pumping action. A new sapphire rod is used for each test.

The pump operates at a pressure of 20 MPa (2900 psi) and a flow rate of 5 ml/min. The seals are tested for leakage in the presence of one of three fluids: de-ionized water, methanol, or a blend of 30% 0.1 M phosphoric buffer solution and 70% methanol.

Pump head seal leakage is evaluated by forcing air through a tube or port on the top side of the pump head housing. Leakage is indicated by placing a collection tissue at the bottom base of the pump head. When seal leakage occurs, the action of the forced air down the backside of the pump head expels moisture down on to the collection tissue. When wetness is observed, a leakage failure is declared.

TABLE 1

Seal performance in the presence of liquid carrier media.

| Test Number | Fluid | Hours to Failure |
| --- | --- | --- |
| 1 | Methanol | 317 hours |
| 2 | Methanol | 553 hours |
| 3 | Buffer Solution | 333 hours |
| 4 | Buffer Solution | 524 hours |
| 5 | De-ionized water | 332 hours |
| 6 | De-ionized water | 407 hours |

Each of the samples exhibits a time to failure of at least about 300 hours in the presence of one of the solvents. In addition, the sapphire rods of the tests exhibit little or no scratching or scarring.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A seal formed of a material comprising about 80.0% to about 95.0% by weight of a modified polytetrafluoroethylene comprising at least about 0.01% by weight and not greater than 5.0% by weight perfluoropropyl vinyl ether, about 1.0% to about 10.0% by weight aromatic polymer selected from the group consisting of polyphenylene sulfide and polyphenyleneoxide, and graphite fiber.

2. The seal of claim 1, wherein the material comprises about 1.0% to about 10.0% by weight of the graphite fiber.

3. The seal of claim 2, wherein the material comprises about 3.0% to about 7.0% by weight of the graphite fiber.

4. The seal of claim 1, wherein the material comprises about 85.0% to about 91.0% by weight of the modified polytetrafluoroethylene.

5. The seal of claim 1, wherein the material comprises about 3.0% to about 7.0% by weight of the aromatic polymer.

6. The seal of claim 1, wherein the seal has a coefficient of friction of between about 0.1 and about 0.5.

7. The seal of claim 1, wherein the seal has a compressive modulus of about 400 MPa to about 800 MPa.

8. The seal of claim 1, wherein the seal has an elongation of about 200% to about 600%.

9. A pump comprising:
a rod; and
a seal including a surface in contact with the rod, the seal formed of a material comprising about 80.0% to about 95.0% by weight of a modified polytetrafluoroethylene comprising at least about 0.01% by weight and not greater than 5.0% by weight perfluoropropyl vinyl ether, about 1.0% to about 10.0% by weight aromatic polymer selected from the group consisting of polyphenylene sulfide and polyphenyleneoxide, and graphite fiber.

10. The pump of claim 9, wherein the rod comprises sapphire.

11. The pump of claim 9, wherein the material comprises about 1.0% to about 10.0% by weight of the graphite fiber.

12. The pump of claim 9, wherein the aromatic polymer comprises polyphenylene sulfide.

* * * * *